(12) United States Patent
Liu et al.

(10) Patent No.: US 8,118,990 B2
(45) Date of Patent: Feb. 21, 2012

(54) ELECTROPLATED MAGNETIC FILM FOR READ-WRITE APPLICATIONS

(75) Inventors: Xiaomin Liu, Fremont, CA (US);
Feiyue Li, Fremont, CA (US);
Cherng-Chyi Han, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 1056 days.

(21) Appl. No.: 11/431,261

(22) Filed: May 10, 2006

(65) Prior Publication Data

US 2007/0261967 A1 Nov. 15, 2007

(51) Int. Cl.
*C25D 3/56* (2006.01)

(52) U.S. Cl. ......................... 205/259; 205/255

(58) Field of Classification Search .............. 205/238, 205/255, 261, 259
See application file for complete search history.

(56) References Cited

U.S. PATENT DOCUMENTS

| | | | | |
|---|---|---|---|---|
| 2,654,703 A | * | 10/1953 | Brown | 205/260 |
| 3,350,180 A | * | 10/1967 | Croll | 428/635 |
| 3,969,399 A | | 7/1976 | Passal | |
| 4,014,759 A | | 3/1977 | McMullen et al. | |
| 4,053,373 A | | 10/1977 | McMullen et al. | |
| 6,469,926 B1 | * | 10/2002 | Chen | 365/158 |
| 6,801,392 B2 | | 10/2004 | Kawasaki et al. | |
| 6,855,240 B2 | * | 2/2005 | Cooper et al. | 205/103 |
| 2003/0209295 A1 | * | 11/2003 | Cooper et al. | 148/311 |
| 2004/0051999 A1 | | 3/2004 | Yazawa et al. | |
| 2006/0029741 A1 | | 2/2006 | Hattori et al. | |

FOREIGN PATENT DOCUMENTS

| | | | | |
|---|---|---|---|---|
| DE | 3736171 A1 | * | 5/1989 | |
| GB | 1461246 A | * | 1/1977 | |
| JP | 04229607 A | * | 8/1992 | |

OTHER PUBLICATIONS

Bal et al., "Investigation of the As-Deposited Characteristics and the Thermal Stability of CoFe and Ru Based Multilayers", Journal of Applied Physics, vol. 91, No. 10, May 15, 2002, pp. 8584-8586.*

* cited by examiner

*Primary Examiner* — Edna Wong
(74) *Attorney, Agent, or Firm* — Saile Ackerman LLC; Stephen B. Ackerman

(57) ABSTRACT

A process is described for the fabrication, through electrodeposition, of $Fe_xCo_yNi_z$ (x=60-71, y=25-35, z=0-5) films that have, in their as-deposited form, a saturation magnetization of at least 24 kG and a coercivity of less than 0.3 Oe. A key feature is the addition of aryl sulfinates to the plating bath along with a suitable seed layer.

2 Claims, 4 Drawing Sheets

ELECTROPLATED MAGNETIC FILM FOR READ-WRITE APPLICATIONS

FIELD OF THE INVENTION

The invention relates to the general field of magnetic read-write heads with particular reference to film preparation and, more specifically, to electroplated magnetic films.

BACKGROUND OF THE INVENTION

Magnetic read-write heads are commonly fabricated as a single integrated unit. Generally, the read head portion is laid down first. It includes a magnetically free layer whose orientation influences the electrical resistance of the device through spin polarization introduced in either a copper spacer due to the GMR effect (Giant Magneto resistance) or in a very thin insulating layer due to the TMR effect (Tunneling Magnetic Resistance).

Because it comprises a series of ultra-thin layers, the read head portion has to be formed through use of vacuum technology. The writer portion of the device, however, comprises layers that are relatively thick by vacuum standards. Because of this, electrodeposition offers, in principle, an attractive alternative for the formation of the write head. However, magnetic thin films, as formed according to state of the art electrodeposition methodologies, do not always have, in their as-deposited forms, the magnetic properties necessary for optimum performance More specifically, films of CoFe or CoNiFe electrodeposited according to the practices of the prior and current art, have been made with either low coercivity or high magnetic saturation but not with both properties in same film. This situation can be remedied to some extend by subjecting the electrodeposited film to a magnetic thermal anneal (typically about 60 minutes at a temperature of at least 200° C. in a magnetic field, along the easy axis, of at least 200 Oe). This heat treatment, while effective in terms of improving the magnetic properties, has the unfortunate side effect of destabilizing the read head that is already there.

Thus, there exists a need for a method of forming, through electrodeposition, a film that has the desired magnetic properties in its as-deposited form. i.e does not require a post deposition anneal in order to meet its specifications.

A routine search of the prior art was performed with the following references of interest being found:

U.S. Pat. No. 2,654,703 (Brown) teaches using aryl sufinates in the electrodeposition of bright Ni, Co, and their alloys. U.S. Pat. No. 3,969,399 (Passal) describes adding hydroxy-sulfinate to a plating bath to plate at least one of Ni and Co. U.S. Pat. Nos. 4,014,759 and 4,053,373 (McMullen et al) disclose aromatic sulfinate and aldehyde or dialdehyde used in iron-containing baths to improve plating of alloys of Fe, Ni, Co.

U.S. Pat. No. 6,801,392 (Kawasaki et al) shows a plating bath for FeNi including a sulfate as a surfacant. U.S. Patent Application 2004/0051999 (Yazawa et al) shows controlled composition of a plating bath to form a soft magnetic film. No sulfinate is disclosed.

U.S. Patent Application 2006/0029741 (Hattori et al) describes a sulfinate used as a surfacant in making a magnetic particle-coated material. U.S. Patent Application 2003/0209295 (Cooper et al) teaches electroplating a CoFe film using an aromatic sulfinic acid or a salt thereof. Benzenesulfinic acid is preferred. The electroplating may be performed on a Ru substrate.

SUMMARY OF THE INVENTION

It has been an object of at least one embodiment of the present invention to provide, through electrodeposition, a magnetic film having, as deposited, both low coercivity and high saturation magnetization.

Another object of at least one embodiment of the present invention has been for said magnetic film to have high corrosion resistance.

Still another object of at least one embodiment of the present invention has been for said film to have low internal stress.

A further object of at least one embodiment of the present invention has been to provide a plating solution and process for depositing said magnetic film.

These objects have been achieved by providing a plating bath that comprises, in solution, all elements that are to be present in said layer, then adding to this plating solution aryl sulfinates in a concentration range of from about 0.05 to 0.3 g/L The resulting films have, as-deposited, a saturation magnetization of at least 24 kG together with a coercivity less than 0.3 Oe.

These films can thus be used for the formation of the write portion of an integrated read-write head. Since the films possess the necessary magnetic characteristics (low coercivity and high saturation magnetization) in their as-deposited form, there is no need for a subsequent magnetic anneal, which would subject the read portion of the device to possible degradation.

DESCRIPTION OF THE PREFERRED EMBODIMENTS

For high recording density, materials with high saturation magnetization, and low coercivity are required. However, materials with high saturation magnetization (greater than 23 kG) usually have a relatively large coercivity as well as poor corrosion resistance, which will limit their application. In the present invention, we disclose a new method to overcome these problems by electrodepositing $Fe_xCo_yNi_z$ films (x=60-71, y=25-35, z=0-5), using an optimized plating bath and a seed layer.

A key feature of the present invention is the addition of organic sulfinates to the plating bath which results in the production of Fe—Co—Ni films having both low coercivity and high saturation magnetization. By choosing the appropriate seed layer (i.e. Ru), the magnetic softness can be further improved (coercivity less than 0.3 Oe).

Although Aryl sulfinates have previously been reported for the electrodeposition of bright Ni, Co, and NiCo alloys to help to refine grain size, they have not been used as a means for controlling the magnetic properties of electrodeposited films.

Of particular importance is that write heads that incorporate such films (i.e. those fabricated according to the teachings of the present invention) do not need to undergo a subsequent high temperature anneal. For a magnetic head, including both a TMJ (tunneling magnetic junction) reader and a write head, the elimination of a later high temperature anneal makes the TMJ reader more stable.

Additionally, the present invention discloses how the addition of a small amount of Ni (<5 atomic %) to a FeCo film improves its corrosion resistance also resulting in films that exhibit unusually low internal stress.

Figure 1:
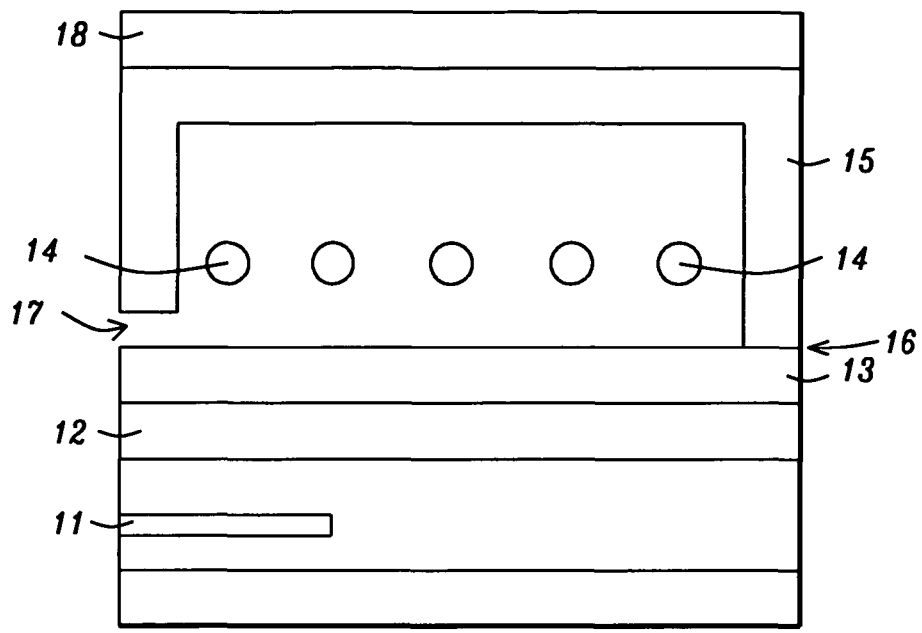
FIG. 1 is a schematic illustration of an integrated read-write head incorporating films deposited according to the teachings of the present invention.

As noted earlier, the present invention is well suited for the formation of the write portion of an integrated read-write head assembly. The latter is schematically illustrated in FIG. 1 which shows read head 11 situated below upper magnetic shield layer 12. Formation of the write head begins with the electrodeposition over upper magnetic shield 12 of first layer of magnetic material 13 which has, as deposited, a saturation magnetization of at least 24 kG and a coercivity less than 0.3 Oe.

Next, magnetizing coil 14 is formed over layer 13 followed by the electrodeposition of second layer of magnetic material 15 over both first layer 13 and coil 14. As before, layer 15 has, as deposited, a saturation magnetization of at least 24 kG and a coercivity less than 0.3 Oe. Layers 13 and 15 are magnetically connected at first end 16 and magnetically separated at the opposite end by write gap 17. The process concludes with the formation of additional magnetic shield layer 18 over layer 15. Thus, formation of the magnetic write head has been completed without subjecting the TMJ read head to a heat treatment.

The composition of the solution used to deposit the films described above is as follows:

| | |
|---|---|
| $NiSO_4 \cdot 6H_2O$ | 0-70 g/L |
| $FeSO_4 \cdot 7H_2O$ | 25-120 g/L |
| $CoSO_4 \cdot 6H_2O$ | 10-60 g/L |
| $H_3BO_3$ | 20-30 g/L |
| NaCl | 0.5-30 g/L |
| Surfactant | 0-0.15 g/L |
| Aryl sulfinates | 0.05-0.3 g/L | pH 2-3

The deposition conditions are as follows:

| | |
|---|---|
| Forward Peak Current Density | 5-30 mA/cm² |
| Reverse Peak current density | 0-10 mA/cm² |
| Forward ON time | 5-100 ms |
| Reverse ON time | 0-30 ms |
| Bath Temperature | 10-25° C. |
| Anode | Ni or Co |

Results

Figure 2A:
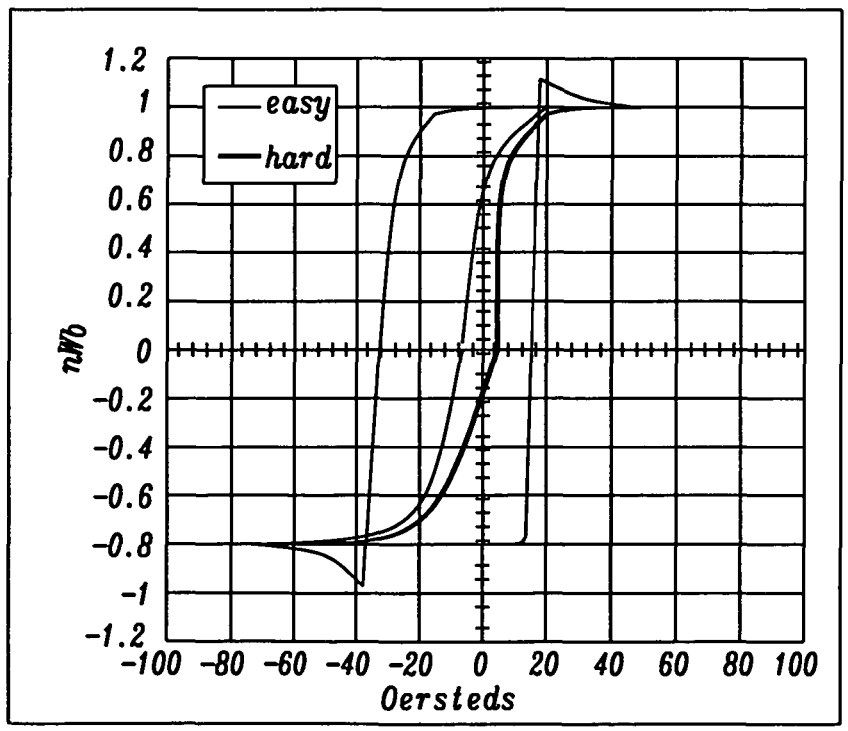
FIGS. 2a and 2b compare B—H loops for films plated from the invented plating bath with films plated from a prior art bath (i.e without added aryl sulfinate).
Figure 2B:
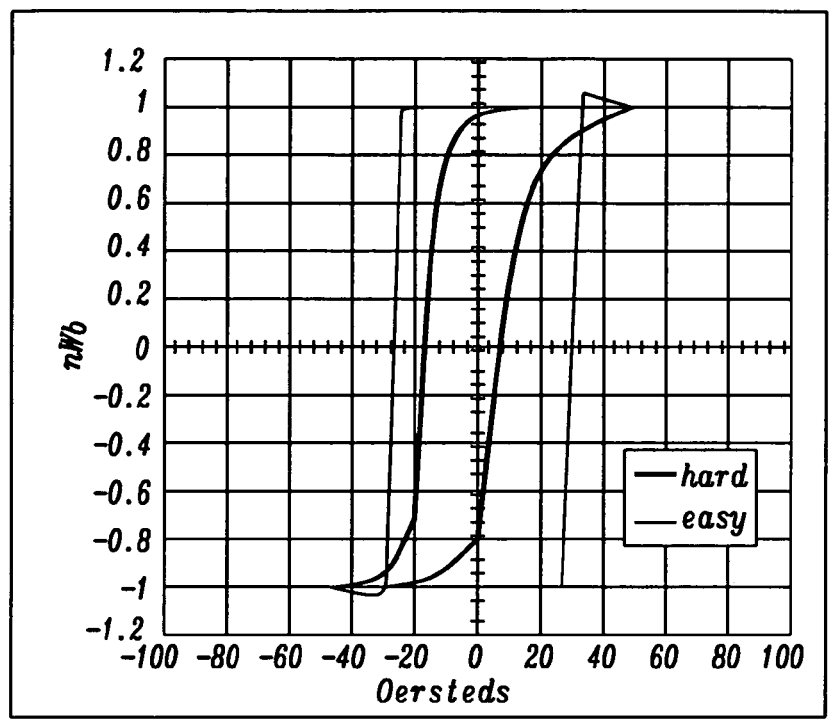
Figure 3A:
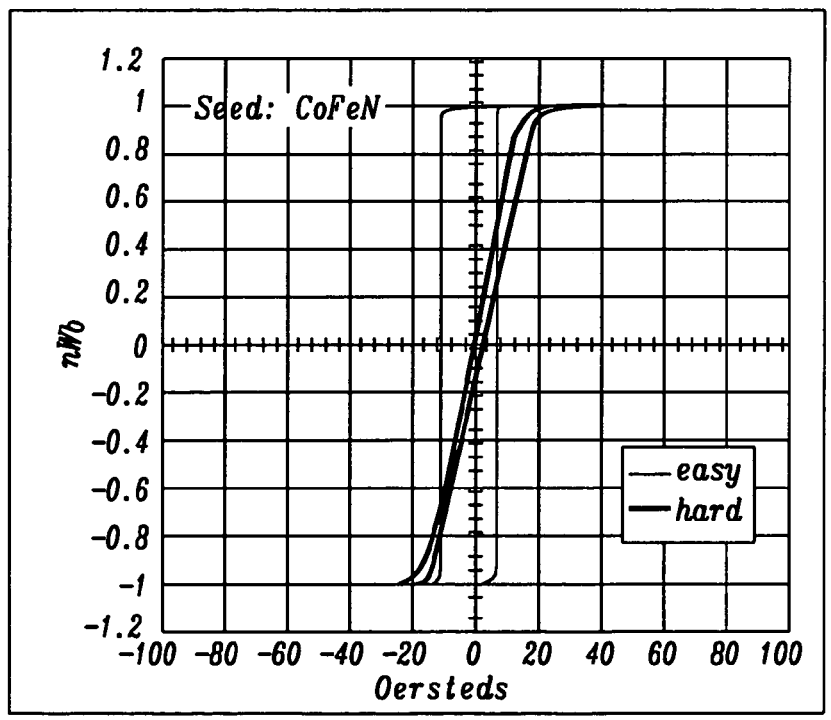
FIGS. 3a-3d compare B—H loops for $Fe_xCo_yNi_z$ films plated on different seed layers.
Figure 3B:
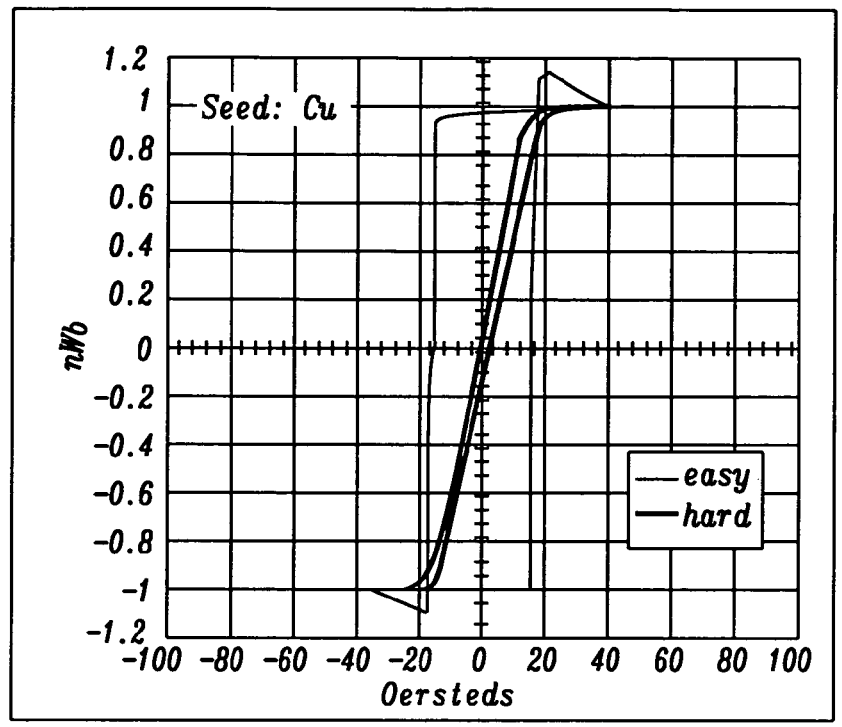
Figure 3C:
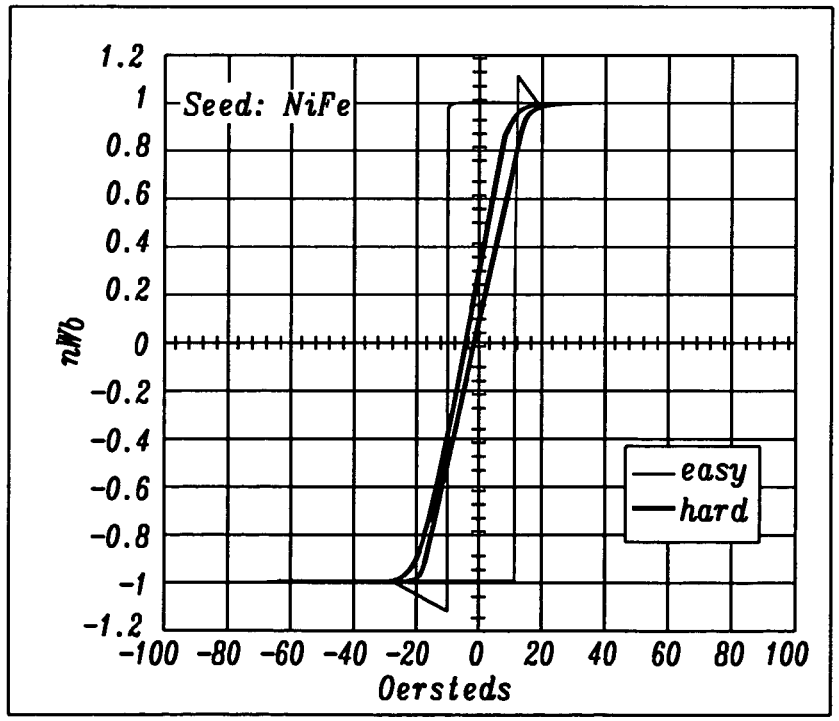
Figure 3D:
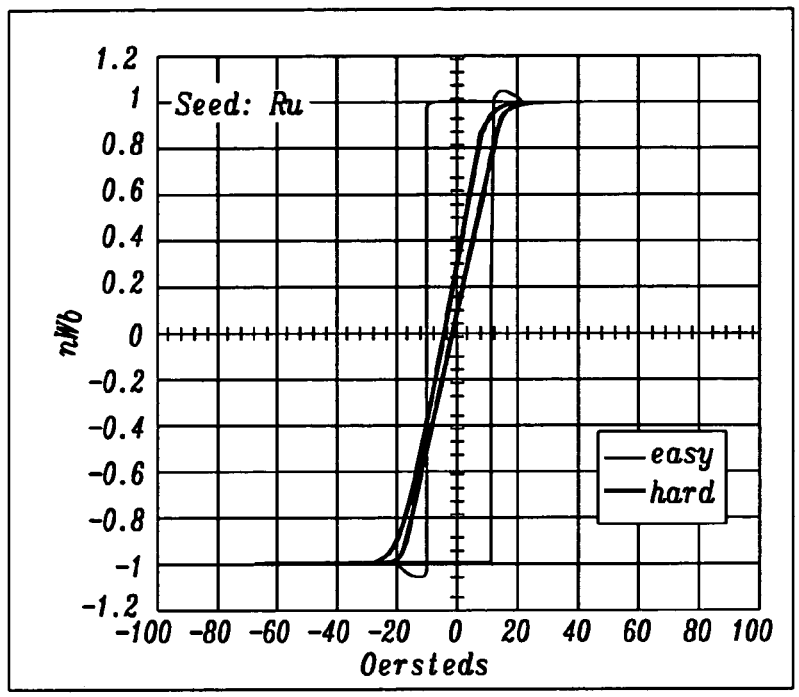

FIGS. 2a and 2b compare B—H loops for films plated from the invented plating bath (i.e with added aryl sulfinate) (FIG. 2a) with films plated from a conventional bath (i.e without added aryl sulfinate) (FIG. 2b). As can be seen, the soft magnetic properties were greatly improved by the addition of aryl sulfinates.

Seed layers can affect film nucleation and growth which, in turn, will affect film properties. FIGS. 3a through 3d compare B—H loops for $Fe_xCo_yNi_z$ (x=60-71, y=25-35, z=~5) films plated on different seed layers. The plating conditions for all four films were the same, with the seed layer varying as follows: 3a CoFeN, 3b Cu, 3c NiFe, and 3d Ru. As can be seen, films plated on a Ru seed layer had an almost closed hard axis loop and had a hard axis coercivity less than 0.3 Oe, which makes this film a good candidate for the fabrication of a write head for high density magnetic recording.

Figure 4:
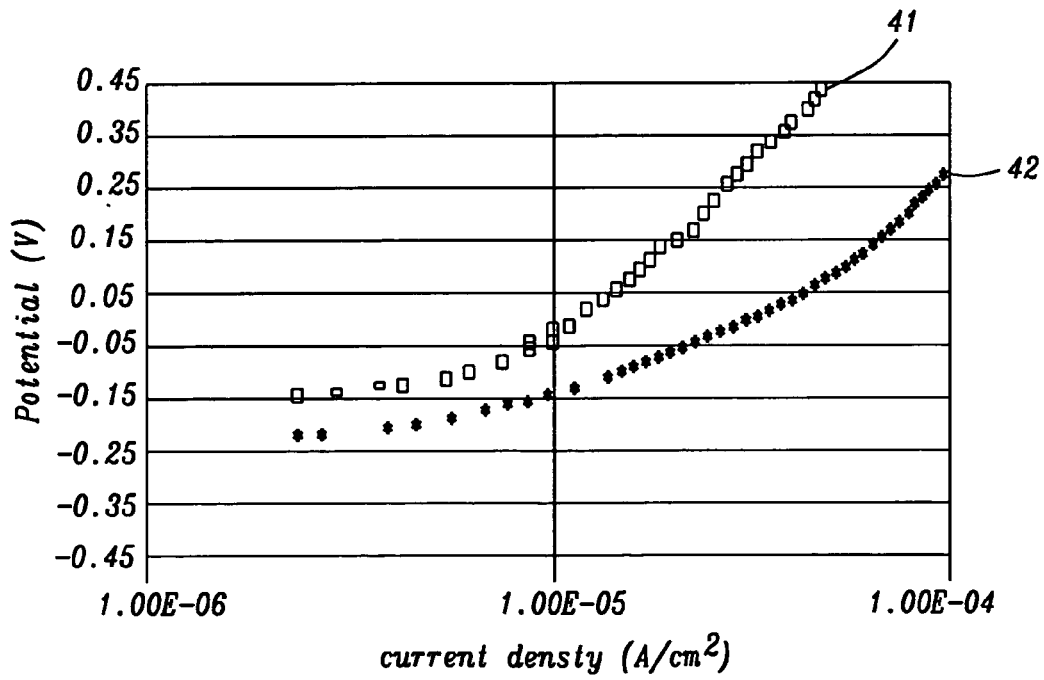
FIG. 4 shows anodic polarization curves for FeCoNi and FeCo films measured from NaCl solutions.

The addition of a small amount of Ni (less than 5 atomic %) to Fe—Co films can improve the anti-corrosion properties. FIG. 4 shows anodic polarization curves for FeCoNi films (curve 41) and FeCo films (curve 42) measured from NaCl solutions. The corrosion potential for FeCoNi film is higher than for FeCo film, and the FeCoNi anodic current density is much lower than for FeCo film at the same potential. These results indicate that the corrosion resistance of FeCoNi films in NaCl solutions is better than that of FeCo films.

What is claimed is:

1. A method to deposit through electrodeposition a layer having magnetic properties that include both a coercivity less than 0.3 Oe and a saturation magnetization of at least 24 kG, consisting of:

providing a plating bath that consists of, in solution, nickel in a concentration range of from 0-70 g/L, iron in a concentration range of from 25-120 g/L and cobalt in a concentration range of from 10-60 g/L, as well as $H_3BO_3$, NaCl, a surfactant, and aryl sulfinates in a concentration range of from about 0.05 to 0.3 g/L; and then electrodepositing said layer from said plating bath, with no subsequent heat treatment, whereby said layer, as deposited, has said magnetic properties.

2. The method of claim 1 wherein said layer is deposited on a seed layer of ruthenium.

* * * * *